United States Patent [19]
Dickens

[11] 3,811,463
[45] May 21, 1974

[54] OVERHEAD BY-PASS FLOOD CONTROL MEANS

[76] Inventor: John Dickens, 1724 W. Superior, Chicago, Ill. 60622

[22] Filed: Apr. 9, 1973

[21] Appl. No.: 349,027

[52] U.S. Cl. .............................. 137/362, 137/115
[51] Int. Cl. ............................................. E03b 5/02
[58] Field of Search ....... 137/115, 362, 569; 417/40

[56] References Cited
UNITED STATES PATENTS

| | | | |
|---|---|---|---|
| 2,569,102 | 9/1951 | Howe | 137/362 X |
| 2,701,026 | 2/1955 | Howe | 137/362 X |
| 1,699,085 | 1/1929 | Vera | 137/115 X |
| 3,017,895 | 1/1962 | Portner | 137/115 |
| 3,020,922 | 2/1962 | Oury | 137/115 |
| 2,347,544 | 4/1944 | Costa et al. | 137/362 X |
| 2,421,066 | 5/1947 | Howe | 137/362 X |
| 2,431,640 | 11/1947 | Gordon | 137/362 X |
| 2,549,204 | 4/1951 | Kaddatz | 137/362 X |
| 2,739,662 | 3/1956 | Sofia | 137/362 X |
| 2,747,678 | 5/1956 | Howe | 137/115 |

Primary Examiner—Alan Cohan
Assistant Examiner—Gerald A. Michalsky

[57] ABSTRACT

A flood control assembly and system having an improved by-pass pipeline for conveying waste fluids from a sump bottom substantially below the sewer line through an overhead portion of the pipeline which extends to a point substantially above the sewer line, and into the sewer line immediately adjacent a valve which is on the street side to help keep said valve closed against upstream flow. The sewer line has an open T which empties waste sewage on the floor of the chamber so that it can drop to a lowered sump for movement through the conveying pipe under urgings of a submersible pump. Sections of the pipeline can be serviced and the pump can be serviced by disassembling the pipeline in an improved way so that either one of these components can be serviced without disrupting the other of the components.

3 Claims, 3 Drawing Figures

OVERHEAD BY-PASS FLOOD CONTROL MEANS

This invention relates to an improved flood control assembly and system which discharges over-flowing waste fluids into a chamber so it can be directly and efficiently collected in a communicating sump and thereafter pumped into a sewer line on the street side of a sewer valve. The pumped sewage helps to keep the valve closed against urgings from downstream flows when sewer backups cause upstream flows.

It is well known to provide a backwater valve in a sewer line to prevent sewer backups into a line within a residential structure. The sewer line must still be used to accommodate water discharge facilities to the street side of the backwater valve. Such means have been disclosed, for example, in U.S. Pat. Nos. 3,017,895; 3,020,922 and 2,747,678.

It is desirable to improve the known assemblies and systems by more efficiently delivering overflow waste sewage to a submersible pump, and to then move this accumulated fluid more efficiently to the street side of the backwater valve of the sewer line. It is also desirable to provide improved means for servicing such an assembly, particularly so that either the sewer line or parts of the pump can be serviced without disrupting the other.

It is therefor one important object of the present invention to provide an improved assembly and system wherein overflow waste fluids are quickly moved out of the sewer line when upstream flow closes the gate valve, and then conveyed under the urgings of a submersible pump to the street side of the valve to obtain removal while still holding the check valve closed against pressures from downstream flows.

Another object is to provide an improved assembly and system which can lead to improved compact installation, indoors or outdoors, by providing a chamber with economic spacing so that essential portions of the flood control system may be grouped in the floor of the chamber. Such essential portions are an open discharge from the sewer line for waste fluids on the house side of the valve, the valve, the opening of the sump which is bottomed below the chamber, and an entry to the street side of the valve in the sewer line. It is an advantageous feature of this object that the close grouping in the economic spacing still allows efficient communicating means between the sump and the sewer line so that accumulated waste sewage can be quickly conveyed under pressure urgings to the street side of the valve for discharge to the main sewer. At the same time, the pressure head of the delivered waste fluids is used to help keep the valve closed against downstream pressures on the house side.

The foregoing advantages are obtained together with still other advantages which will occur to practitioners by considering the invention as shown in the following disclosure.

The use of the same numerals in the various views of the drawings will indicate a reference to the same structures, parts or elements, as the case may be.

Figure 1:
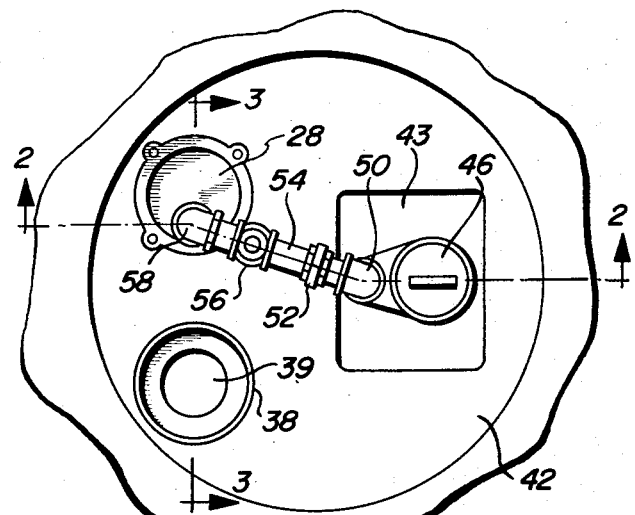
FIG. 1 is a top elevational view of a chamber with closely grouped components for discharging over-flow waste fluids from the sewer line, for collecting such waste fluids in a sump, for moving such waste fluids under pressure to an overhead by-pass, and for collecting such delivered fluids in the sewer line on the street side of a valve.
Figure 2:
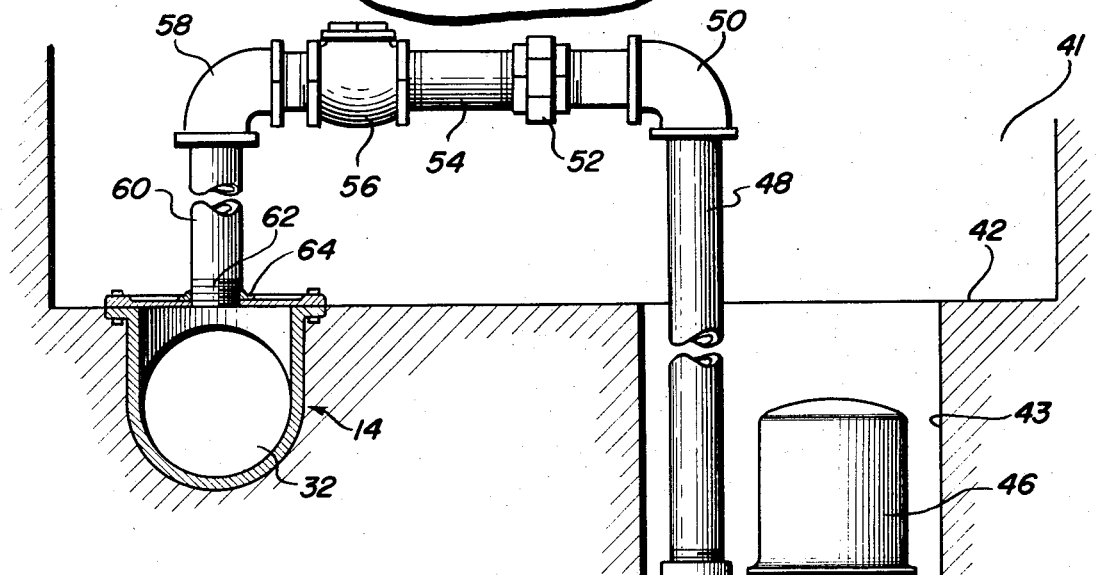
FIG. 2 is a view taken on an enlarged scale along line 2—2 of FIG. 1.
Figure 3:
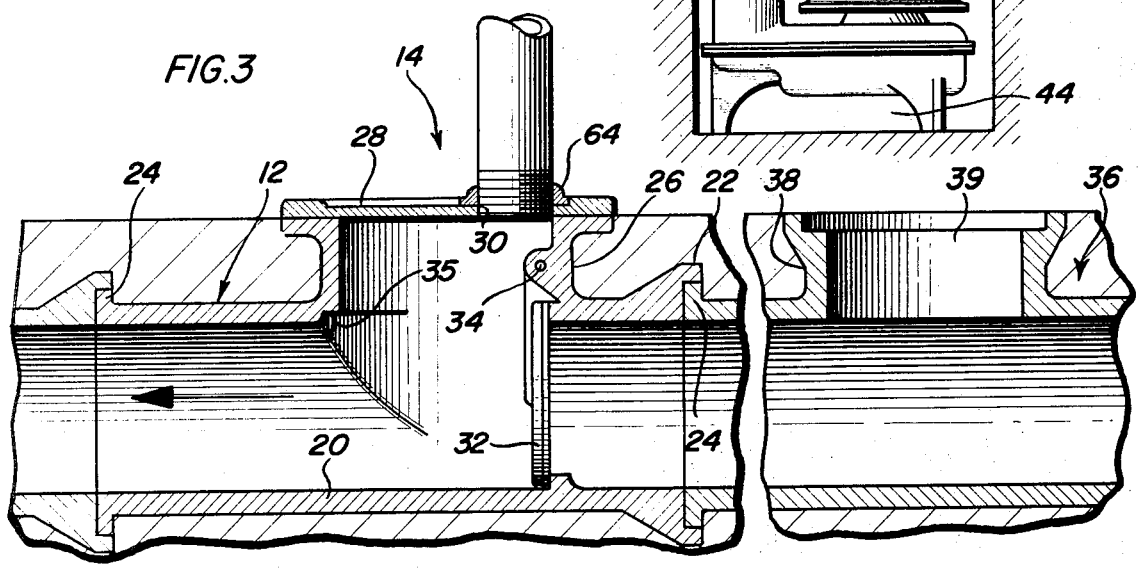
FIG. 3 is a view on an enlarged scale taken along line 3—3 of FIG. 1.

The view of FIG. 3 illustrates a portion of a linear sewer line 12 having sections joined together. These include a back-water valve section shown generally as 14. The valve section includes a horizontal conduit part formed by a substantially continuous wall 20, such section having a female end 22 and an opposite male flanged end 24. The flanged end 24 is adapted to be snugly received within a recess of the collar or female end 22, as shown.

The valve section 14 also includes a vertical conduit part formed from a continuous wall 26 which is flanged at the top. The horizontal and vertical conduit parts form a T section, and the open top of the vertical conduit part of the T is closed by cover 28 having a tapped opening 30 shown extending to the interior of the continuous wall.

A valve member 32 is shown attached by pivoted mounting 34 to the inside of the continuous wall 26. The opposite bottom edge of the continuous wall has an indented stop 35 to limit the upward travel or swinging movement of the valve member 32.

Immediately adjoining the valve T-section is an open T-section shown generally as 36. This section also has a horizontal conduit part which is contiguous with the linear sewer line, and also has a vertical conduit part formed by a continuous wall 38 having an opening 39 at the top. In one embodiment, the vertical conduit parts of the valve T-section 14 and the open T-section 36 are coextensive. The linear disposition of the sewer line is not disrupted or modified by the present assembly and system, and this results in more efficient operation because over-flow waste fluids can be more quickly discharged through opening 39 into an upper compact chamber 41.

The waste fluids are discharged onto the floor 42 of the chamber, and such fluids collect on the bottom of sump 43 which extends below the floor of the chamber. While not shown, it is preferred that the top of the chamber is covered to protect the components and parts of the floor control assembly, and to also prevent offensive odors from being widely disseminated. Appropriate vent means may be provided, not shown, for discharging such offensive odors to a location where they are not detected at uncomfortable levels.

A submersible sump pump is located at the bottom of the sump, and this is a conventional pump which has a flow actuated switch that turns on the pump when water reaches predetermined levels in the sump. The pump intake 44 is at the bottom of the pump and such intake is provided with the usual disentegrator blades for breaking up solids in the waste fluids. The pumped waste fluids are delivered into a conveying pipeline, shown as having an ascending branch 48 which starts substantially below the sewer line and extends to a point substantially above the sewer.

The ascending branch extends vertically relative to the submersible pump, and it is joined by threaded elbow 15 to a transverse branch 54. The transverse branch extends in parallel relationship to the floor 42 of the chamber. A double threaded collar junction 52 is provided in the transverse branch so that a separable small branch portion is to one side adjacent the ascending branch, and a longer portion is to the other side. Such longer branch has a check valve 56 which allows the waste fluids to move through the by-pass or conveying pipeline only from the sump to the sewer line. The transverse branch is connected by threaded elbow 58 to the descending branch 60 which drops to the tapped opening 30 in the cover 28. The bottom of the descending branch has a threaded end 62 which engages a tapped opening 30, and which is additionally held in place by threaded collar 64. It is seen that the descending branch 60 is substantially shorter than the ascending branch 48, the greater length of the ascending branch resulting from the greater length needed to reach the submersible pump which is positioned below the surface 42 of the chamber.

The improved features which lead to advantages in the present flood control assembly and system include the compact space of the components in the floor of the chamber. These components are the opening of the sump 43, the opening 39 of the T-section 36, and the cover 28 with the tapped opening 30 in the valve T-section 14. The overflowing waste fluids are quickly discharged through opening 39 and collect in sump 43 where the fluid is delivered under pressure from a point below the sewer line to a point above the sewer line through the overhead by-pass. The waste fluids conveyed under pressure are delivered against the street side of the valve member, and such pressurized delivery helps to maintain the valve member closed against downstream pressures resulting from use of water facilities in the residence. It is seen that all the components are easily accessible for servicing and inspection in the chamber 41. The improved location of the double threaded junction 52 allows the transverse branch to be separated so that either the pump or the sewer line can be serviced without disassembling or disrupting both of these components.

The sump is bottomed below the sewer line so that the collected waste fluids are delivered under greater pressures to the by-pass which is located at a point substantially above the sewer line. Such waste fluids are delivered under high pressures against the valve member to maintain the valve in a closed position. Not only is a compact arrangement provided and a quick discharge and collection of waste fluids, but improved flood control is attained while keeping the member in a closed position against downstream fluid pressures.

The claims are now presented, and the terms used therein may be further understood by reference to the language of the preceeding specification and the views of the drawing.

What is claimed is:

1. A flood control system which includes
a linear sewer line having contiguous sewer line sections, one of said sections being a T valve section having a valve closable to upstream flow and openable to downstream flow, said T valve section having a removable cover and a tapped opening in said cover immediately adjacent the valve within the pipeline section, and a contiguous section being an overflow open T-section,
a chamber, a floor at the bottom of the chamber, the opening of the open T-section emptying into said chamber and the cover of said T valve section being exposed in said chamber,
a sump communicating with the chamber and bottomed substantially below the floor of the chamber,
a submersible pump on the bottom of the sump, said pump having a flow actuated switch which starts operation of the pump when the water in the sump reaches predetermined levels,
a pipeline conveying waste sewage from the sump to the sewer line on the street side of the valve, said pipeline having an ascending branch from the pump extending into the chamber to a point substantially above the sewer line, a transverse branch extending substantially parallel to the floor of the chamber to a point above the valve section, and a descending branch dropping to the cover and mounted to the tapped opening in said cover,
a check valve in the pipeline allowing waste fluids to be conveyed only to the sewer line,
threaded junction means in said pipeline to allow disassembly of the pipeline for servicing one of the sewer line components and the pump components without disassembling the other of said components, and
said opening in the overflow T-section, the cover of the valve section and the opening of the sump being closely grounded in the common floor of the chamber.

2. A flood control system which includes the features of claim 1 above wherein said threaded junction means in a removable threaded collar mounted between a long portion of the transverse branch and a short portion of the transverse branch said short portion being adjacent the ascending branch of the pipeline.

3. A flood control system which includes the features of claim 1 above wherein the valve T-section has a horizontal conduit part contiguous with the linear sewer line and a vertical conduit part formed by a continuous side wall, the cover being mounted to the top of said continuous side wall, said valve being pivotally mounted to the inside of said continuous wall and said tapped opening extending to the interior of the continuous wall above the valve mounting.

* * * * *